United States Patent
Meisner

(10) Patent No.: US 6,820,429 B2
(45) Date of Patent: Nov. 23, 2004

(54) ADAPTIVE ACCELERATION SCHEDULES FOR GAS TURBINE ENGINE CONTROL SYSTEMS

(75) Inventor: Richard Meisner, Glastonbury, CT (US)

(73) Assignee: Goodrich Pump & Engine Control Systems, Inc., West Hartford, CT (US)

( * ) Notice: Subject to any disclaimer, the term of this patent is extended or adjusted under 35 U.S.C. 154(b) by 4 days.

(21) Appl. No.: 10/295,571

(22) Filed: Nov. 15, 2002

(65) Prior Publication Data

US 2003/0131605 A1 Jul. 17, 2003

Related U.S. Application Data

(60) Provisional application No. 60/335,387, filed on Nov. 15, 2001.

(51) Int. Cl.[7] ................................................. F02C 9/00
(52) U.S. Cl. ......................... 60/773; 60/39.27; 60/795
(58) Field of Search .............................. 60/39.27, 773, 60/779, 782, 795

(56) References Cited

U.S. PATENT DOCUMENTS

| | | |
|---|---|---|
| 2,743,578 A | 5/1956 | Hazen |
| 4,117,668 A | 10/1978 | Hall et al. ................... 60/39 |
| 4,490,791 A | 12/1984 | Morrison .................. 364/431 |
| 4,603,546 A | 8/1986 | Collins ........................ 60/39 |
| 5,226,287 A * | 7/1993 | Ng ......................... 60/39.281 |
| 5,732,546 A | 3/1998 | Pineo ........................... 60/39 |
| 6,513,333 B2 * | 2/2003 | Sugitani ..................... 60/773 |

FOREIGN PATENT DOCUMENTS

| | | |
|---|---|---|
| EP | 0 980 980 A2 | 2/2000 |
| EP | 1 063 402 A2 | 12/2000 |
| GB | 1363956 | 8/1974 |
| GB | 2122398 A | 1/1984 |
| JP | 2002-138857 | 5/2002 |

OTHER PUBLICATIONS

Application No. 09/963,221.
Application No. 10/194,811.
Application No. 60/335,387.
International Search Report PCT/US02/36769.

* cited by examiner

*Primary Examiner*—Louis J. Casaregola
(74) *Attorney, Agent, or Firm*—David J. Silvia; Edwards & Angell, LLP

(57) ABSTRACT

Disclosed is an engine surge avoidance system and method which adapts the acceleration schedules (i.e., $P_{2.5}$ bleed valve and NDOT) to prevent engine surge events from occurring while minimizing reductions in engine response time. The surge avoidance system and method disclosed herein achieves this goal by adapting both the NDOT and the $P_{2.5}$ bleed schedules in an optimum fashion.

16 Claims, 6 Drawing Sheets

ADAPTIVE ACCELERATION SCHEDULES FOR GAS TURBINE ENGINE CONTROL SYSTEMS

CROSS-REFERENCE TO RELATED APPLICATIONS

This application claims priority to U.S. Provisional Patent Application Ser. No. 60/335,387, filed Nov. 15, 2001, entitled "Adaptive Acceleration Schedules for Gas Turbine Engine Control Systems," which is herein incorporated by reference in its entirety.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject disclosure relates a control system for use with gas turbine engines, and more particularly, to a control system for helicopters which includes a system for preventing engine surge events by adapting acceleration schedules stored in the aircraft computer's non-volatile memory.

2. Background of the Related Art

During the operation of a gas turbine engine, a condition known as a "surge" may be encountered. An engine surge is generally regarded as a mismatch between the speed of the compressor blades and the incoming air. An engine surge is typically a precursor to an engine stall event. Engine surges are characterized by a sudden and large loss of power, a loss of air flow, an increase in temperature and mechanical vibration. These mechanical vibrations, as well as the temperature increases, impose substantial stress on the engine and particularly on the turbine blades. While also occurring under other operating conditions, an engine surge event will most often occur during acceleration.

Prior attempts to ensure that engine surge events will not occur have concentrated on the establishment of fuel flow rate or acceleration schedules stored in the aircraft's flight control computer. The acceleration schedule is traditionally provided by the engine manufacturer and is developed over time. The schedule protects the engine from surge, stall and overtemperature by regulating the fuel flow. The acceleration schedule is a function of the engine operating characteristics, and therefore, it is specific or unique to a particular engine model. The schedule typically represents the demanded rate of change of the gas generator speed ($NDOT_{Demand}$) as a function of measured gas generator speed (NG) and engine inlet air temperature and pressure. The schedule is not linear, but of complex shape. The complexity of the schedule is partly due to the need to prevent the engine from operating in the compressor stall region.

Thus, for example, prior art fuel controls have been pre-programmed with an acceleration schedule and, in theory, if fuel flow is maintained in accordance with the requirements of the schedule, the engine is accelerated without surge. It is to be noted that, if an excess of fuel is delivered to the engine during surge, the engine is likely to stay in the surge condition or experience multiple surges. Therefore, prior art control systems will typically include a safety factor which is known as the surge margin. The surge margin will be taken into account in deriving the acceleration schedule and the engine will be capable of accepting a predetermined percentage of additional fuel flow before surge will occur.

Engine controls are designed and implemented for the operating characteristics of a new engine. However, the characteristics of an engine and/or its fuel metering system will vary over time as the equipment ages. Accordingly, what may have initially been an adequate acceleration schedule and/or surge margin may, with engine and/or fuel control deterioration, no longer ensure that the engine will not surge.

Commonly owned U.S. Pat. No. 4,490,791 to Morrison discloses a prior art system and method for accommodating component wear over time by modifying or adapting the acceleration schedule. In response to an engine surge the region of the acceleration schedule where the surge was encountered is lowered or decremented to increase surge margin. The disclosed system senses the decay rate of engine compressor discharge pressure during surge and modifies the pre-programmed fuel flow acceleration schedule so as to increase surge margin. Thus, an adaptive acceleration schedule is provided wherein "modifiers" are stored in memory which correspond to each of the stored acceleration schedule breakpoints. The modifiers are scale factors which are initially equal to unity.

However, each time a surge is detected, the modifier which corresponds to the point on the acceleration schedule where the surge was experienced will be decremented by a preselected percentage. The fuel flow related information from the acceleration schedule is multiplied by the modifier with the result that, subsequent to a surge having been detected, future accelerations will be modified within a small corrected speed band surrounding the surge point.

Another system and method for adapting the acceleration schedules is disclosed in U.S. patent application Ser. No. 10/194,811, filed Jul. 12, 2002, entitled "Method of Engine Surge Discrimination," the disclosure of which is herein incorporated by reference in its entirety. In adapting the acceleration schedule, the disclosed system discriminates between spurious engine surges and genuine engine surges.

Although prior art systems prevent many surge events from occurring, they do so with little regard for the slow engine response which results from adapting the acceleration schedule. As a result, after an in-flight adaptation, the aircraft is typically grounded for maintenance and the engine is repaired before the aircraft is declared flight-worthy.

Therefore, there is a need for an adaptation approach which modifies the acceleration schedule to prevent future surge events and minimizes the impact on engine response time, thereby allowing the aircraft to fly until the next normally scheduled maintenance period and reducing downtime.

SUMMARY OF THE INVENTION

The disclosure of the present application relates to an engine surge avoidance system and method which adapts the acceleration schedules stored in the aircraft computer's non-volatile memory to prevent engine surge events from occurring while minimizing reductions in engine response time. The surge avoidance system and method disclosed herein achieves this goal by adapting both the NDOT and the intercompressor ($P_{2.5}$) bleed schedules in an optimum fashion.

In accordance with a preferred embodiment of the present invention, there is disclosed a method of preventing surge events in a gas turbine engine following an initial surge event. The gas turbine engine typically includes, in serial flow communication, a low pressure compressor, a high pressure compressor, a combustor, a high pressure turbine and a low pressure turbine. The method includes establishing a transient temperature limit for the gas turbine engine and estimating the combustor discharge gas temperature. Then, the combustor discharge gas temperature is compared to the established transient temperature limit. If the estimated combustor discharge gas temperature is less than the established transient temperature limit, the low pressure compressor bleed air flow rate schedule is modified so as to improve an engine surge avoidance margin. Alternatively, if the estimated combustor discharge gas temperature is greater than the established transient temperature limit, the engine fuel flow rate schedule is modified so as to improve the engine surge avoidance margin.

It is envisioned that the method disclosed herein may further include the step of measuring the combustor discharge gas temperature with a sensing means operatively positioned on the engine housing. Alternatively, the method may further include measuring a plurality of engine operating parameters and estimating the combustor discharge gas temperature using a thermodynamic engine model and the plurality of measured engine operating parameters. The plurality of operating parameters can include, but are not limited to, parameters such as component operating temperature, component inlet and exhaust air/gas temperatures or pressures, shaft, bearing speed or gear rotational speed, and engine shaft torque. The engine model is adaptive can be used to estimate component efficiencies and unknown operating parameters based on the measured operating parameters.

It is presently envisioned that prior to modifying the engine fuel flow schedule if the estimated combustor discharge gas temperature is greater than the established transient temperature limit, the maximum allowable modification to the fuel flow schedule is established and a determination is made as to whether the maximum allowable modification to the fuel flow schedule has been reached. If the maximum has been reached, the low pressure compressor bleed air flow rate schedule are modified so as to improve the engine surge margin.

The step of modifying an engine fuel flow rate schedule if the predicted combustor discharge gas temperature is greater than the established transient temperature limit includes estimating a core shaft speed for the engine.

Preferably, the low pressure compressor bleed air flow rate schedule defines a bleed valve position over an entire range of low pressure compressor shaft speeds. Additionally, the fuel flow rate schedule defines an acceleration rate for the engine's core shaft over an entire range of engine core shaft speeds. In a representative embodiment, the acceleration rate and core shaft speed for the engine are corrected by temperature of low pressure compressor inlet air.

The present disclosure is also directed to a system for preventing surge events in a gas turbine engine following an initial surge event. As before, the gas turbine engine preferably includes in serial flow communication a low pressure compressor, a high pressure compressor, a combustor, a high pressure turbine and a low pressure turbine. A representative system includes a mechanism for establishing a transient temperature limit for a gas turbine engine, a mechanism for estimating a combustor discharge gas temperature and a device for comparing the estimated combustor discharge gas temperature to the established transient temperature limit. If the estimated combustor discharge gas temperature is less than the established transient temperature limit the system includes a mechanism for modifying the low pressure compressor bleed air flow rate schedule stored in non-volatile computer memory so as to improve an engine surge avoidance margin. If the estimated combustor discharge gas temperature is greater than the established transient temperature limit, the system includes a component for modifying an engine fuel flow rate schedule stored in non-volatile computer memory limit so as to improve the engine surge avoidance margin.

In a preferred embodiment the system further includes a sensor operatively positioned on the engine housing. Alternatively, the system includes a mechanism for measuring a plurality of engine operating parameters and estimating based on the measured parameters the combustor discharge gas temperature using a thermodynamic engine model.

Those skilled in the art will readily appreciate that the subject invention prevents engine surge events from occurring while minimizing the degradation of engine response time.

These and other unique features of the control system disclosed herein will become more readily apparent from the following description, the accompanying drawings and the appended claims.

BRIEF DESCRIPTION OF THE DRAWINGS

So that those having ordinary skill in the art to which the present application appertains will more readily understand how to make and use the same, reference may be had to the drawings wherein.

These and other features of the subject disclosure will become more readily apparent to those having ordinary skill in the art from the following detailed description of preferred embodiments.

DETAILED DESCRIPTION OF PREFERRED EMBODIMENTS

Figure 1:
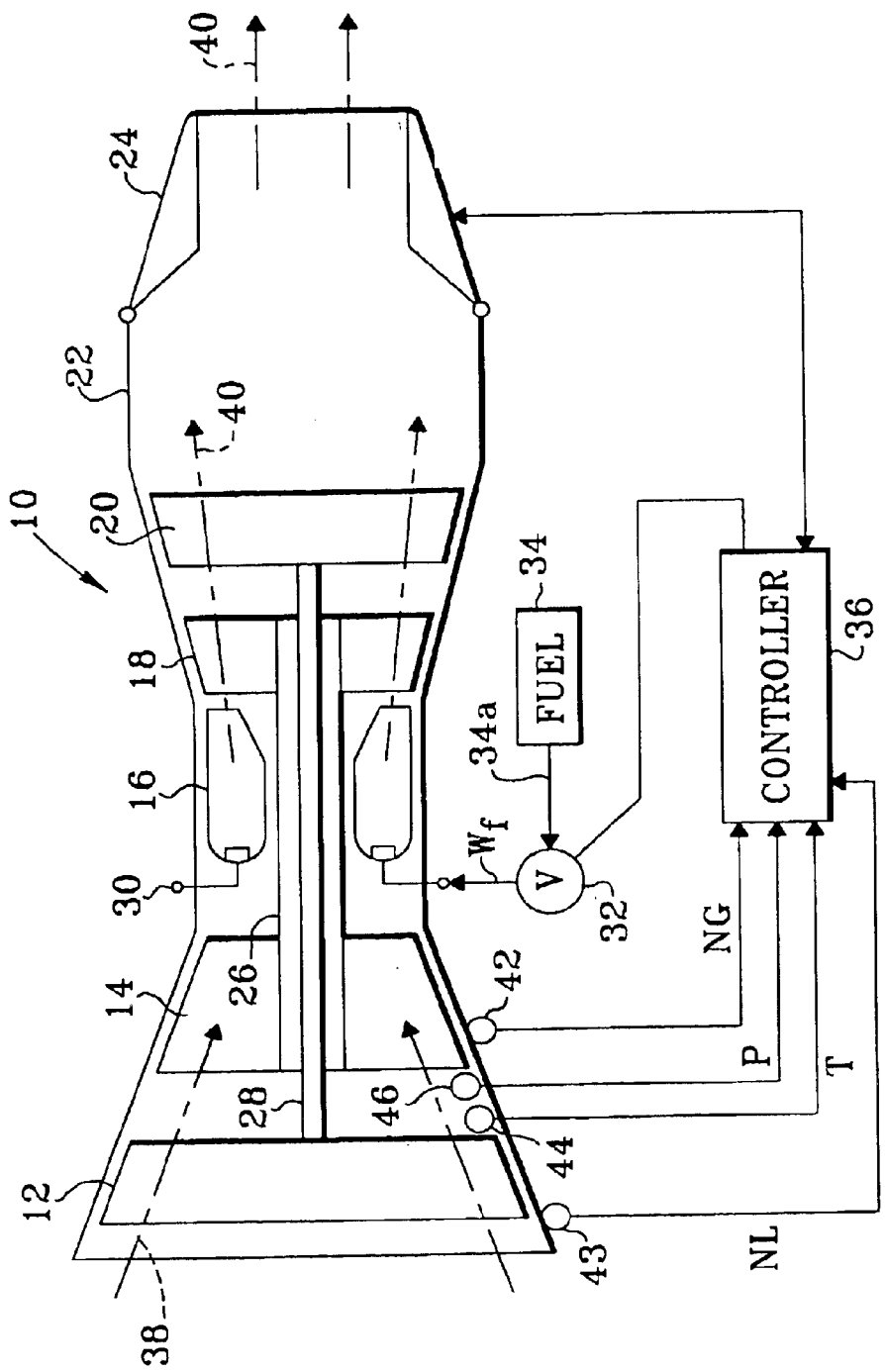
FIG. 1 is a schematic representation of a typical gas turbine engine and fuel control system therefor.

Referring now to the drawings wherein like reference numerals identify similar elements of the subject invention, there is illustrated in FIG. 1 a schematic representation of an exemplary aircraft gas turbine engine 10. The engine 10 includes, in serial flow communication, a plurality of conventional components including a low pressure compressor 12, a high pressure compressor 14, and an annular combustor 16. The engine 10 further includes a high pressure turbine 18, which may be a single stage for example, a low pressure turbine 20, which may also be a single stage, for example, an afterburner or augmenter 22 including separate fuel injectors (not shown), and a cooperating variable area exhaust nozzle 24.

The low pressure compressor 12, high pressure compressor 14, high pressure turbine 18, and low pressure turbine 20 each include respective rows of circumferentially spaced apart rotor blades and cooperating stator vanes or nozzles in a conventional configuration. The high pressure turbine 18 is fixedly joined to the high pressure compressor 14 by a core shaft or rotor 26. And, the low pressure turbine 20 is fixedly joined to the low pressure compressor 12 by a corresponding low pressure compressor shaft or rotor 28.

A plurality of conventional fuel injectors 30 are mounted around the upstream inlet end of the combustor 16 and are disposed in flow communication with a conventional fuel control valve 32. The valve 32 is suitably joined to a fuel tank 34 which contains fuel 34a which is suitably pressurized and provided to the valve 32 for metered flow therethrough to the injectors 30.

The engine 10 also includes a digitally programmable controller 36 which may take any conventional form, and is suitably electrically joined to the fuel valve 32 for controlling operation thereof and metering the fuel flow, designated $W_f$, into the combustor 16.

In normal operation, air indicated by flow lines 38 enters the low pressure compressor 12 and is pressurized through the high pressure compressor 14, mixed with the fuel 34a in the combustor 16 and suitably ignited for generating hot combustion gas indicated by flow lines 40. The combustion gas 40 is discharged from the combustor 16 and enters the high pressure turbine 18, which extracts energy therefrom for powering the high pressure compressor 14. The combustion gas 40 in turn flows downstream through the low pressure turbine 20 which extracts additional energy therefrom for powering the low pressure compressor 12. When desired, additional fuel may be introduced and ignited in the afterburner 22 for augmenting thrust from the engine 10, with the variable area exhaust nozzle 24 being suitably operatively joined to the controller 36 for varying the exhaust area thereof for use in controlling the engine 10 in a conventional manner.

Various sensors are used in the engine 10 for detecting a variety of engine operating conditions. The sensors are operatively joined to the controller 36 for controlling operation of the engine 10 in a conventional manner. For example, engine 10 includes a conventional core shaft speed sensor 42 adjoining the core rotor 26 at any convenient location, such as at the radially outer tips of the rotor blades of the high pressure compressor 14, for measuring rotational speed (NG), of the core rotor 26 during operation. The speed sensor 42 provides a suitable electrical signal representative of NG for use in the controller 36. The core speed NG is an actual speed, and it is conventional to correct the speed in the controller 36 for use in controlling the engine. Corrected core speed NGc is typically accomplished by using a temperature sensor 44 suitably mounted between the low pressure compressor 12 and the compressor 14 for measuring the temperature of the air 38 entering the high pressure compressor 14 and providing a corresponding electrical signal to the controller 36. Core speed NG is typically corrected by dividing the measured value by the square root of the compressor inlet absolute temperature, normalized by standard day temperature.

A sensor 43 can also be used to measure the speed of the low pressure compressor (NL), and the signal can be corrected within controller 36 to account for the operating temperature.

As state above, a surge is generally regarded as a mismatch between the speed of the compressor blades and the incoming engine air and is a precursor to engine stall. Various techniques have been developed for sensing the occurrence of a stall condition in a gas turbine engine. In general, a mild stall is indicated by one or more of the following: abnormal engine noise, rapid exhaust gas temperature fluctuations, RPM fluctuations, engine pressure ratio decrease or fluctuation, vibration due to compressor pulsation, or poor engine response to power level movements. A severe stall can be indicated by loud engine noises, flame, vapor, or smoke at the engine inlet and/or exhaust, and may be accompanied by engine malfunction or failure (see, for example, "Aircraft Gas Turbine Engine Technology", 2nd Edition, 1979, I. E. Treager, Mcgraw-Hill, Inc., pgs. 123–126).

Previous techniques that are known for detecting an engine surge include a technique which compares engine control parameters with actual engine parameters. By way of example, the existence of a sustained difference between a rate of change in engine speed, that is demanded ($NDOT_{demanded}$) by an engine control and the actual rate of change in engine speed ($NDOT_{actual}$) may indicate a surge condition. Another technique uses an engine signature to detect an engine surge, and relies primarily on a measurement of combustor burner pressure. In particular, this technique relies on sensing a transient spike in the combustor burner pressure. A third, and generally more complex technique employs a large number of engine and airframe parameters which are individually weighted and compensated.

A system and method for detecting a surge event is not the subject of the present application, however, an exemplary embodiment of the surge avoidance system of the present invention receives a signal from a surge detection system (SDS) prior to implementing the surge avoidance logic disclosed herein. The output of the SDS is a surge flag (SRGFLG) signal. The SRGFLG signal is employed as an input to the subject control system or surge avoidance system for use in adapting the stored acceleration schedules so as to avoid the occurrence of, or recover from, an engine stall. Of course, the SRGFLG signal may also be employed to provide an audio and/or visual surge indicator to a pilot.

Figure 2:
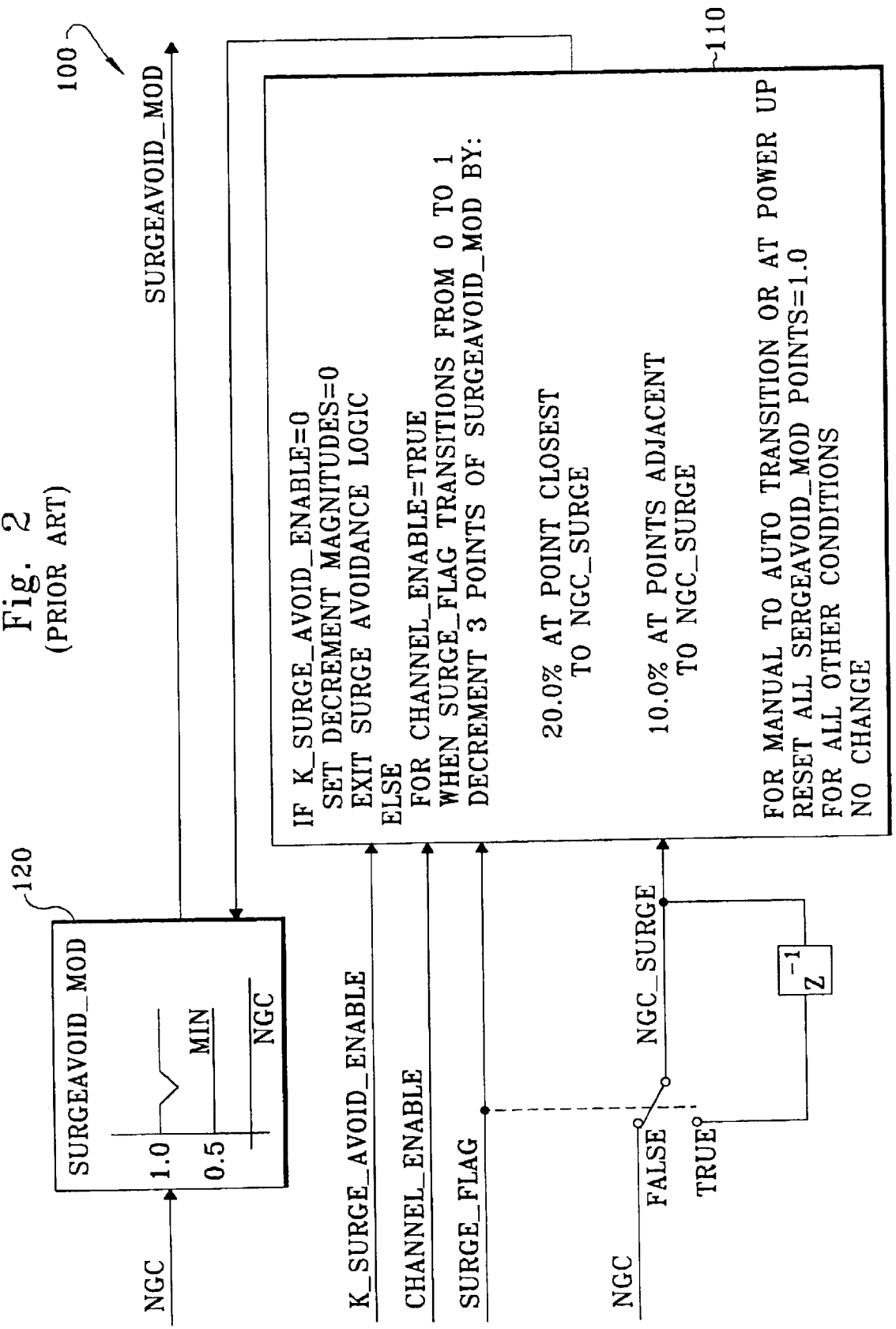
FIG. 2 is a functional block diagram which illustrates a prior art acceleration schedule adaptation technique.

Referring now to FIG. 2 which provides a functional block diagram for a prior art "adaptive" surge avoidance system designated generally by reference numeral 100. As shown therein, surge avoidance system 100 modifies (i.e., decrements) the engine acceleration schedule following a surge event in order to avoid future surges. In operation, when the surge avoidance system is enabled, the decrement magnitudes are set at zero. Once the surge detection system (not shown) determines that a surge has occurred, the SURGE_FLAG transitions from 0 to 1. In response thereto, the surge avoidance logic 110 decrements at 3 points the surge avoidance modifier 120. The modifier 120 is decremented by 20% at the point closest to the corrected gas generator shaft speed corresponding to the surge event (NGc_surge) and 10% at the opposed points adjacent to NGc_surge. Surge avoidance logic 110 resets all of the points in the modifier to 1.0 (i.e., decrement magnitudes to zero) at power-up. It should be noted that surge avoidance modifier 120 has a lower limit of 0.5 or 50%. The modifier 120 is applied to the acceleration schedule and the engine control system adjusts the fuel flow accordingly. Although this system prevents surge events from recurring, it does so with little regard for the slow engine response which results from the adaptation.

Figure 3:
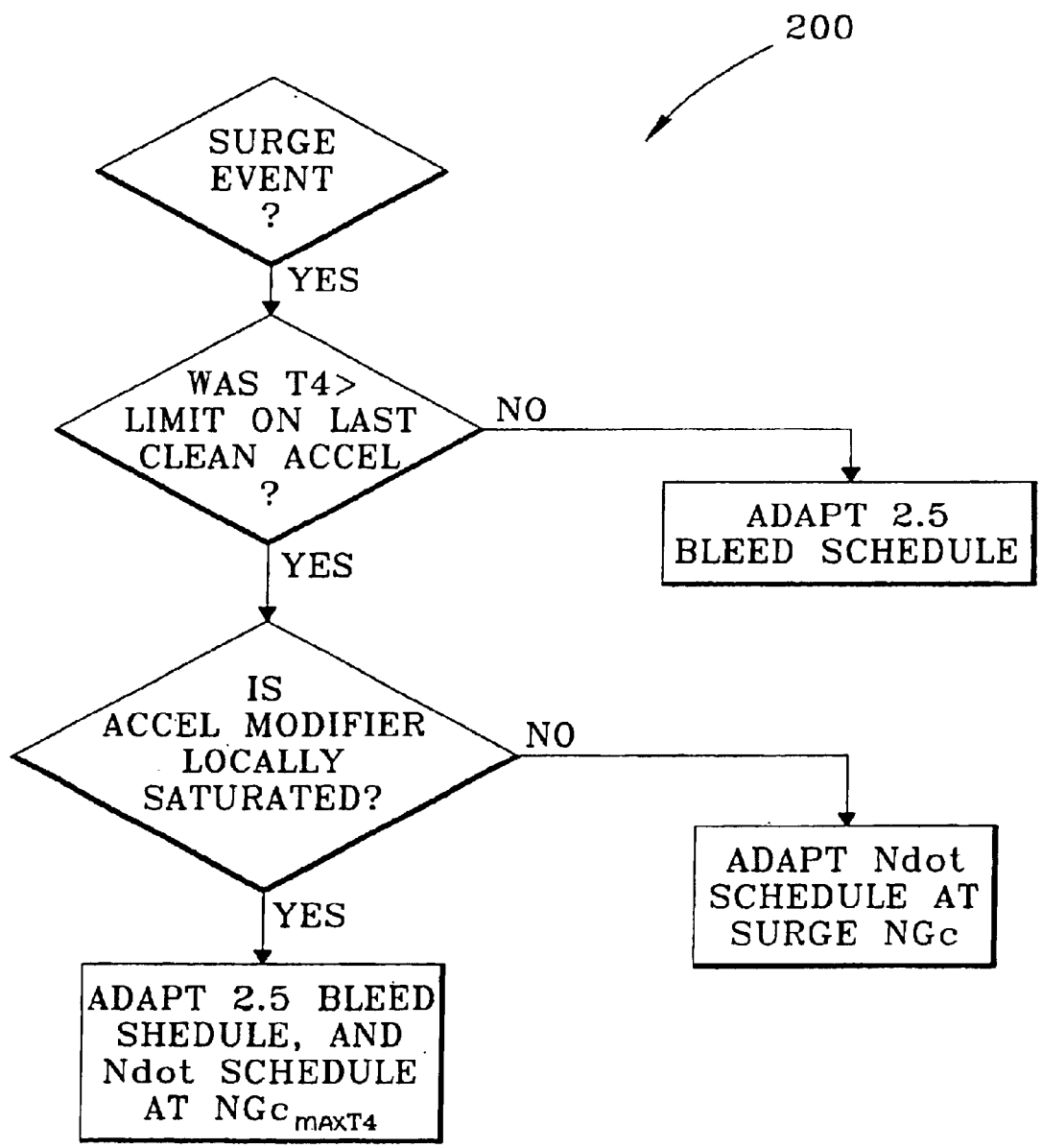
FIG. 3 is a flow chart representative of the adaptive acceleration schedule logic of the subject disclosure.

Referring now to FIG. 3 there is illustrated a flow chart for the surge avoidance method of the present disclosure which is designated generally by reference numeral 200. A shown therein, if a surge event is detected by the SDS, the transient temperature of the combustor discharge gas $T_{4.0}$ is compared to a pre-established temperature limit. The temperature of the combustor discharge gas $T_{4.0}$ can be sensed directly using a temperature sensor operatively positioned on the engine housing or $T_{4.0}$ can be predicted/estimated using, for example, an adaptive engine model as disclosed in U.S. patent application Ser. No 09/963,221, entitled "Adaptive Aero-Thermodynamic Engine Model," the disclosure of which is hereby incorporated by reference in its entirety. As discussed in this application, the predicted $T_{4.0}$ will change based on changes in the component efficiencies over time caused by wear.

Figure 6:
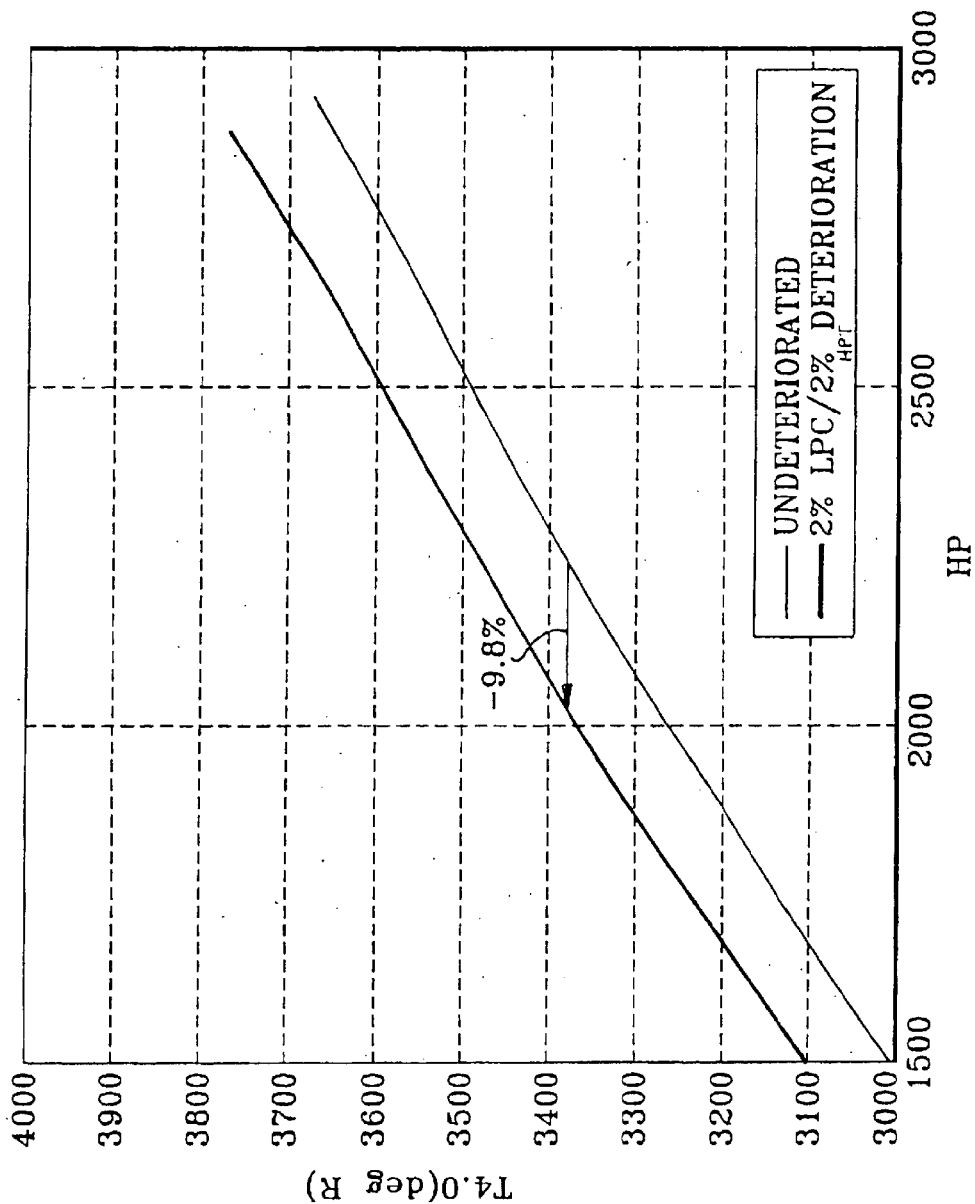
FIG. 6 is a graphical representation of the change in $T_{4.0}$ and the steady state horsepower (HP) resulting from a 2% degradation in both the low pressure compressor and high pressure turbine efficiencies.

FIG. 6 provides a graphical representation of the change in $T_{4.0}$ and the steady state horsepower resulting from a 2% degradation in both the low pressure compressor and high pressure turbine efficiencies. It should be noted that the pre-established transient temperature limit would be established by the engine manufacturer and would be unique to each engine design. However, the transient temperature limit can be adjusted based on operational data and experience.

If the engine is operating below its transient temperature limit prior to an initial surge event, then sufficient head-room exists to schedule more transient bleed air. Therefore, if the temperature limit has not been exceeded, the compressor inlet air bleed valve schedule is adapted to increase/schedule more transient bleed air. The addition of transient bleed air prevents engine surge events by increasing the transient surge margin without adversely impacting engine response time. Transient temperatures do increase somewhat as a result of the scheduling of more transient bleed air, but the engine still operates below its temperature limit.

Figure 5A:
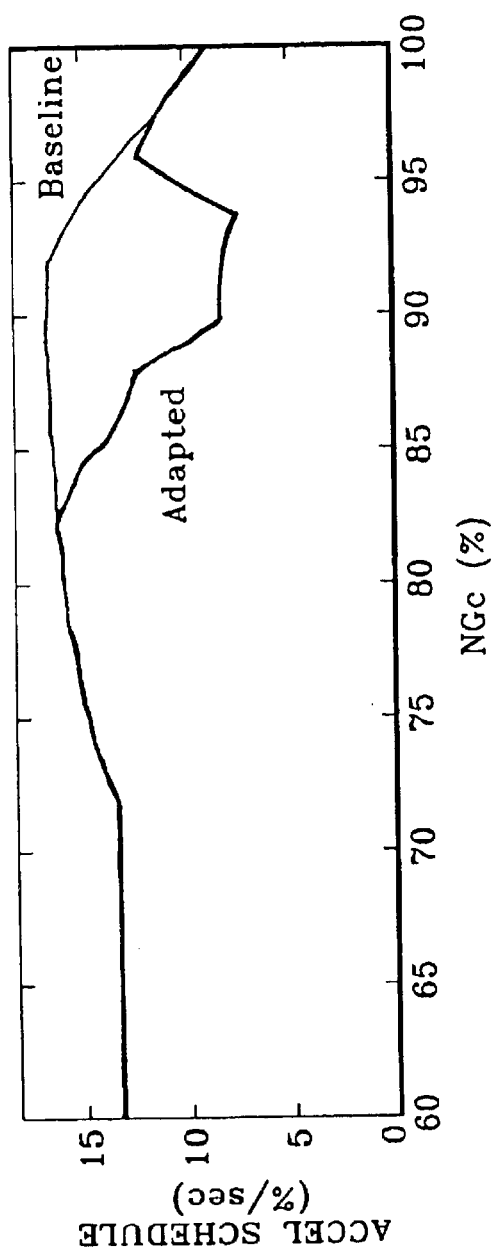
FIG. 5a is a graphical comparison of the baseline and the adapted fuel flow acceleration schedule.
Figure 5B:
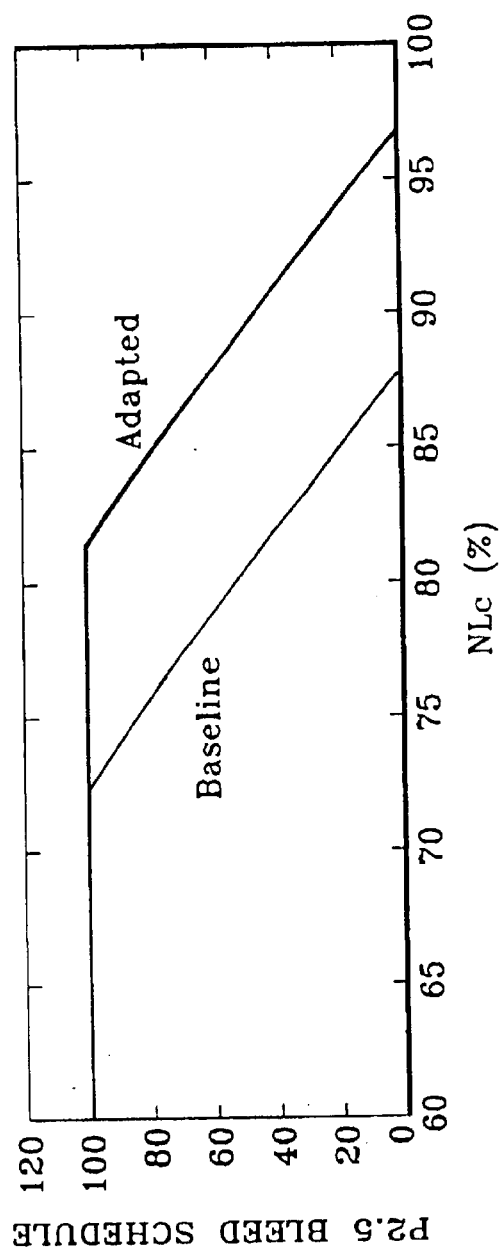
FIG. 5b is a graphical comparison of the baseline and the adapted $P_{2.5}$ bleed valve acceleration schedule.

If the engine is already operating at its transient temperature limit prior to the initial surge event, then the only recourse is to adapt the NDOT acceleration schedule because of the temperature increase associated with scheduling more transient bleed air. As shown in FIG. 3, prior to adapting the NDOT schedule, it is preferable to review the modifier to determine if the lower limit has been reached (i.e., if it is saturated). If the lower limit has not been reached, the NDOT schedule is adapted. The schedule can be adapted as previously disclosed or by using any known adaptation technique, for example, the technique disclosed in U.S. Pat. No. 4,490,791 to Morrison. Lowering the NDOT also prevents engine surge events, but at the expense of a slower response time. This approach does however lower the operating temperatures, so that if the engine performance deteriorates and an additional surge is encountered, further bleed air can be used to prevent subsequent surge events without further degrading response time. FIGS. 5a and 5b provide comparisons of the baseline versus the adapted schedules for NDOT and $P_{2.5}$, respectively.

The approach disclosed herein optimally adjusts NDOT and $P_{2.5}$ bleed schedules to provide both transient surge and temperature margin. The amount of adaptation of the $P_{2.5}$ bleed schedule can also be predetermined based on engine performance testing and can be adjusted based on operational experience. As noted above, FIG. 5b provides a illustration of an adapted $P_{2.5}$ bleed valve schedule. The graphical representation provided therein illustrates that the adaptation shifts the schedule to the right such that more bleed valve air is provided when the corrected low pressure compressor speed is in excess of about 73% of the corrected low pressure compressor speed (NLc).

Figure 4:
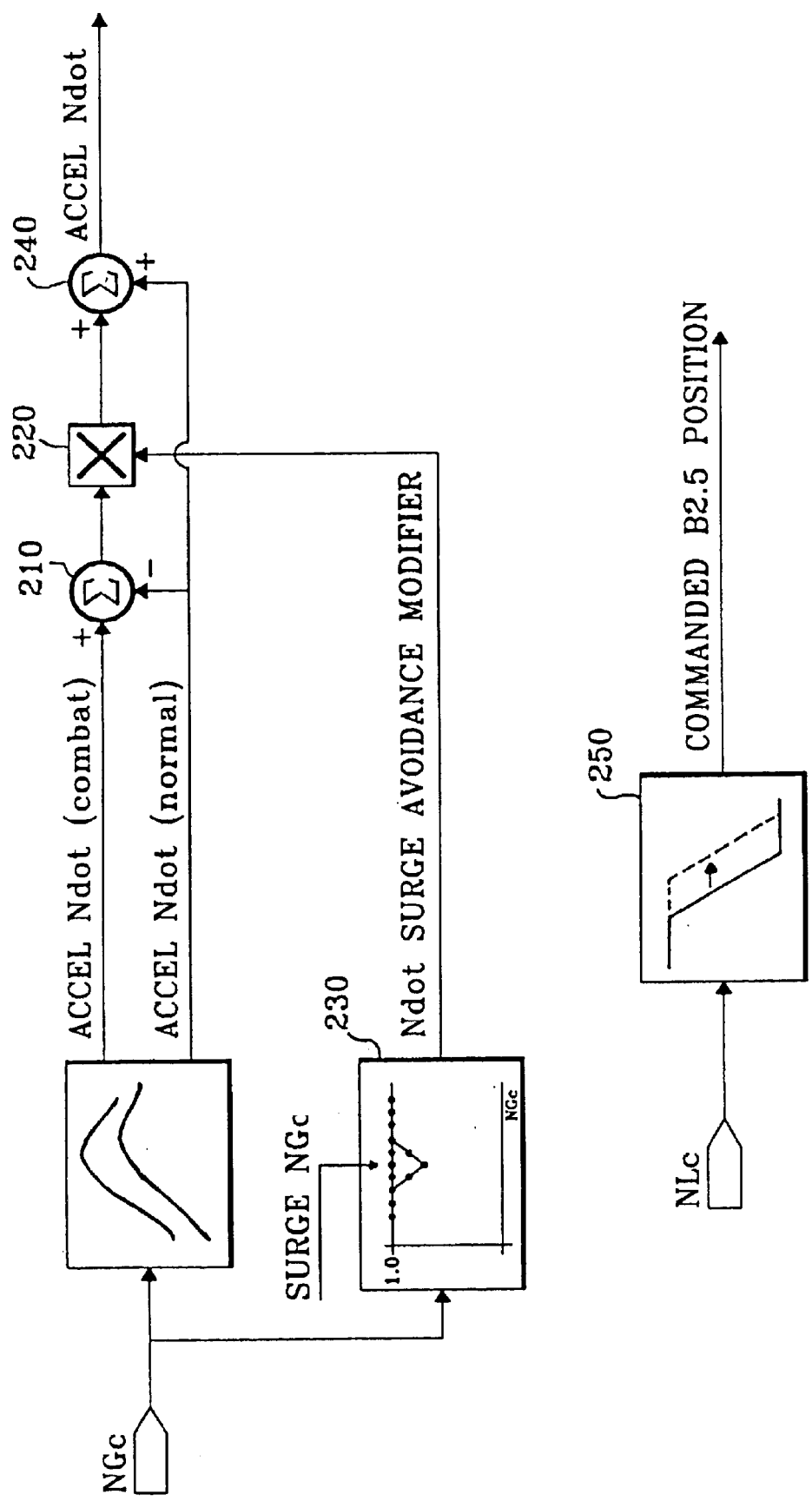
FIG. 4 is a functional block diagram illustrating the surge avoidance system of the present disclosure.

Referring now to FIG. 4, there is depicted a schematic representation of a control system of the present disclosure which adapts either the $P_{2.5}$ bleed valve schedule or the NDOT acceleration schedule based on the surge avoidance method 200 described in FIG. 3. A signal representing NGc is provided to the schedule representing $NDOT_{demanded}$ vs. NGc to determine $NDOT_{demanded}$. Two curves are provided on the schedule, the first representing the combat operation configuration, and the second representing the normal operation mode. Signals representing the $NDOT_{combat}$ or $NDOT_{normal}$ are provided to summing junction 210. The magnitude of $NDOT_{normal}$ is subtracted from $NDOT_{combat}$ and an output signal representing the resultant is provided to multiplier logic 220.

A signal representing NGc is also provided to the surge avoidance modifier 230, which has been decremented as directed by surge avoidance method 200. A signal representing the modifier which correlates to the NGc is provided to multiplier logic 220. The output of multiplier logic 220 is provided to summing junction 240 and added to $NDOT_{normal}$. The resulting value is provided to the fuel control system (not shown) so as to regulate the fuel flow to the combustor. Concurrently, a signal representing NLc is provided to bleed valve schedule 250 which provides as an output the commanded bleed valve position.

While the invention has been described with respect to preferred embodiments, those skilled in the art will readily appreciate that various changes and/or modifications can be made to the invention with departing from the spirit or scope of the invention as defined by the appended claims.

What is claimed is:

1. A method of preventing surge events in a gas turbine engine following an initial surge event, the method comprising the steps of:
    a) establishing a transient temperature limit for a gas turbine engine;
    b) estimating a combustor discharge gas temperature;
    c) comparing the estimated combustor discharge gas temperature to the established transient temperature limit;
    d) modifying a low pressure compressor bleed air flow rate schedule stored in non-volatile computer memory if the estimated combustor discharge gas temperature is less than the established transient temperature limit so as to improve an engine surge avoidance margin; and
    e) modifying an engine fuel flow rate schedule stored in non-volatile computer memory if the estimated combustor discharge gas temperature is greater than the established transient temperature limit so as to improve the engine surge avoidance margin.

2. A method according to claim 1, further comprising the step of measuring the combustor discharge gas temperature with a sensing means operatively positioned on the engine housing.

3. A method according to claim 1, further comprising the steps of:
    a) measuring a plurality of engine operating parameters; and
    b) estimating the combustor discharge gas temperature using a thermodynamic engine model and the plurality of measured engine operating parameters.

4. A method according to claim 1, wherein prior to modifying an engine fuel flow schedule if the estimated combustor discharge gas temperature is greater than the established transient temperature limit, the method further comprises the steps of:

a) establishing a maximum allowable modification to the fuel flow schedule;
b) determining if the maximum allowable modification to the fuel flow schedule has been reached; and
c) modifying the low pressure compressor bleed air flow rate schedule so as to improve the engine surge margin if the maximum allowable modification to the fuel flow schedule has been reached.

5. A method according to claim 1, wherein the step of modifying an engine fuel flow rate schedule if the predicted combustor discharge gas temperature is greater than the established transient temperature limit comprises the step of estimating the speed of the engine's high pressure compressor.

6. A method according to claim 1, wherein the low pressure compressor bleed air flow rate schedule defines a bleed valve position over an entire range of low pressure compressor shaft speeds.

7. A method according to claim 1, wherein the fuel flow rate schedule defines an acceleration rate for the engine's core shaft over an entire range of engine core shaft speeds.

8. A method according to claim 7, wherein the acceleration rate and core shaft speed for the engine are corrected by temperature of low pressure compressor inlet air.

9. A system for preventing subsequent surge events in a gas turbine engine following an initial surge event, the gas turbine engine including in serial flow communication a low pressure compressor, a high pressure compressor, a combustor, a high pressure turbine and a low pressure turbine, the system comprising:
a) means for establishing a transient temperature limit for a gas turbine engine;
b) means for estimating a combustor discharge gas temperature;
c) means for comparing the estimated combustor discharge gas temperature to the established transient temperature limit;
d) means for modifying a low pressure compressor bleed air flow rate schedule stored in non-volatile computer memory if the estimated combustor discharge gas temperature is less than the established transient temperature limit so as to improve an engine surge avoidance margin; and
e) means for modifying an engine fuel flow rate schedule stored in non-volatile computer memory if the estimated combustor discharge gas temperature is greater than the established transient temperature limit so as to improve the engine surge avoidance margin.

10. A system as recited in claim 9, further comprising means for measuring the combustor discharge gas temperature using a sensor operatively positioned on the engine housing.

11. A system as recited in claim 9, further comprising:
a) means for measuring a plurality of engine operating parameters; and
b) means for estimating the combustor discharge gas temperature using a thermodynamic engine model and the plurality of measured engine operating parameters.

12. A system as recited in claim 9, further comprising:
a) means for establishing a maximum allowable modification to the fuel flow schedule;
b) means for determining if the maximum allowable modification to the fuel flow schedule has been reached; and
c) means for modifying the low pressure compressor bleed air flow rate schedule so as to improve the engine surge margin if the maximum allowable modification to the fuel flow schedule has been reached.

13. A system as recited in claim 9, wherein further comprising means for estimating the speed of the engine's high pressure compressor.

14. A system as recited in claim 9, wherein the low pressure compressor bleed air flow rate schedule defines a bleed valve position over an entire range of low pressure compressor shaft speeds.

15. A system as recited in claim 9, wherein the fuel flow rate schedule defines an acceleration rate for the engine's core shaft over an entire range of engine core shaft speeds.

16. A system as recited in claim 15, wherein the acceleration rate and core shaft speed for the engine are corrected by temperature of low pressure compressor inlet air.

* * * * *